US008449242B2

(12) United States Patent
Yazawa et al.

(10) Patent No.: US 8,449,242 B2
(45) Date of Patent: May 28, 2013

(54) INDUSTRIAL ROBOT AND METHOD OF TRANSPORTING THE SAME

(75) Inventors: Takayuki Yazawa, Nagano (JP); Akiko Yamada, Nagano (JP)

(73) Assignee: Nidec Sankyo Corporation (JP)

( * ) Notice: Subject to any disclaimer, the term of this patent is extended or adjusted under 35 U.S.C. 154(b) by 807 days.

(21) Appl. No.: 12/593,496

(22) PCT Filed: Mar. 25, 2008

(86) PCT No.: PCT/JP2008/000716
§ 371 (c)(1),
(2), (4) Date: Dec. 10, 2009

(87) PCT Pub. No.: WO2008/120466
PCT Pub. Date: Oct. 9, 2008

(65) Prior Publication Data
US 2010/0104411 A1    Apr. 29, 2010

(30) Foreign Application Priority Data
Mar. 26, 2007 (JP) ................. 2007-079166

(51) Int. Cl.
*B25J 18/00* (2006.01)
(52) U.S. Cl.
USPC ............ 414/744.5; 74/490.05; 212/176; 414/744.3; 901/15; 901/28
(58) Field of Classification Search
USPC ............ 414/744.3, 744.5; 212/294, 295, 212/175, 176; 74/490.01, 490.05; 52/116, 52/117; 901/15, 28
See application file for complete search history.

(56) References Cited

U.S. PATENT DOCUMENTS

| 3,433,368 A | * | 3/1969 | Durand | 212/295 |
| 6,202,868 B1 | * | 3/2001 | Murray | 212/294 |
| 6,343,918 B1 | | 2/2002 | Atake | |

FOREIGN PATENT DOCUMENTS

| EP | 0839627 A2 | 5/1998 |
| ES | 2188850 T3 | 7/2003 |
| JP | 3048494 U | 2/1998 |
| JP | 10-128816 A | 5/1998 |
| JP | 2000-24966 A | 1/2000 |
| JP | 2001-274218 A | 10/2001 |
| JP | 2006-321019 A | 11/2006 |
| JP | 2007-61964 A | 3/2007 |

OTHER PUBLICATIONS

International Search Report for International Application No. PCT/JP2008/000716 mailed Jun. 17, 2008 with English translation.

* cited by examiner

*Primary Examiner* — Donald Underwood
(74) *Attorney, Agent, or Firm* — Cantor Colburn LLP

(57) ABSTRACT

An industrial robot may include an arm unit equipped with a hand structured to place a workpiece on the hand, a column structured to support the arm unit so as to enable the arm unit to move in a vertical direction, a hinge provided at an intermediate position in the vertical direction structured to section and fold the column into a base column and an upper column, supporting members placed on each of the base column and the upper column, screw support members placed on each of the supporting members, a screw shaft that is screwed into the screw support members, a base column side and an upper column side of the screw shaft being threaded reversely to each other, and a screw shaft turning means for turning the screw shaft. The industrial robot carries out transfer work of the workpiece at a predetermined working space.

8 Claims, 6 Drawing Sheets

INDUSTRIAL ROBOT AND METHOD OF TRANSPORTING THE SAME

CROSS REFERENCE TO RELATED APPLICATIONS

This application is a National Stage Application of International Patent Application No. PCT/JP2008/000716, filed Mar. 25, 2008, which claims priority to Japanese Patent Application No. 2007-079166 filed on Mar. 26, 2007, the disclosure of each which is incorporated by reference herein and priority to each of which is also claimed herein.

FIELD OF THE INVENTION

The present invention relates to an industrial robot and a method of transporting the robot. More specifically, the present invention relates to a large-sized industrial robot and a transportation method for the robot that enables transporting the robot at low cost and rebuilding it easily without disassembling it.

BACKGROUND

An industrial robot; including an arm unit equipped with a hand for placing a workpiece on it, and a column that supports the arm unit so as to enable the arm unit to move in a vertical direction; is used as a robot that carries out transfer work, for example, to transfer a workpiece such as a glass substrate for a display unit to various processing units, wherein the glass substrate being loaded on a cassette. In these years, as workpieces are sized larger, industrial robots generally become larger. Especially, when a vertical dimension of a column in an industrial robot is long, there is no transportation method available for transporting the robot as it is. Therefore, a problem is that disassembling work before transportation and rebuilding work after transportation costs much. Furthermore, as total weight of industrial robots becomes greater, other problems come up with regard to installation work after transportation, such as a large crane required at a work site after transportation. Incidentally, there is no prior art found for solving such problems, and descriptions with regard to such a prior art are omitted.

At least an embodiment of the present invention provides a large-sized industrial robot and a transportation method for the robot that enables transporting the robot at low cost and rebuilding it easily without disassembling it.

SUMMARY OF THE INVENTION

To achieve the benefits described above, at least an embodiment of an industrial robot according to the present invention includes: an arm unit equipped with a hand for placing a workpiece on the hand, and a column for supporting the arm unit so as to enable the arm unit to move in a vertical direction, wherein the industrial robot carries out transfer work of the workpiece at a predetermined working space; and the industrial robot further includes: a hinge for sectioning and folding the column into two parts, i.e., a base column and an upper column, at an intermediate position in the vertical direction; supporting members placed on each of the base column and the upper column separately; screw support members placed on each of the supporting members; a screw shaft that is screwed into the screw support members, a base column side and an upper column side of the screw shaft being threaded reversely to each other; and a screw shaft turning means for turning the screw shaft.

According to the present invention, at least an embodiment of the industrial robot includes the hinge, the supporting members, the screw support members, the screw shaft, and the screw shaft turning means. Therefore, the column extending in the vertical direction can be sectioned and folded into two parts, i.e., the base column and the upper column. As a result, even when the industrial robot is so long in a vertical direction that it cannot be transported as it is, the robot can be so postured as to enable transportation of the robot through simple preparation for transportation without complicated disassembling and re-assembling work. Furthermore, the industrial robot can be rebuilt easily without any large crane or the like at a work site of a transportation destination. Especially, it is possible to easily carry out installation and re-building work in a limited space, such as a clean room and the like. Incidentally, the "intermediate position in the vertical direction" means a predetermined point between a top end and a bottom end of the column.

In at least an embodiment of the industrial robot according to the present invention, the supporting members include top parts that are located away from the base column and the upper column; and the screw support members are assembled to the top parts so as to be rotatable.

As the screw shaft turning means turns the screw shaft, the upper column bends, being sectioned from the base column. According to at least an embodiment of the present invention, the supporting members include top parts that are located away from the base column and the upper column, and then the screw support members are assembled to the top parts so as to be rotatable. Therefore, the screw support members assembled to the top parts of the supporting members rotate in accordance with bending condition of the upper column, as the upper column bends down. As a result, the screw shaft screwed into the screw support members can smoothly rotate without any problem to bend the upper column. In other words, when a center of gravity of the upper column shifts within a range from the tip side to the bottom side of the column according to a change of the bending condition of the upper column, the screw shaft has no bending stress but only a tensile stress and a compressive stress in a direction of the screw shaft.

In at least an embodiment of the industrial robot according to the present invention, the industrial robot includes; a base, which is rotatable and on which the column is installed, and a loading means placed at an opposing position in relation with the position of the column for shifting a center of gravity of the base closer to a rotation center of the base, the column being installed at an eccentrically-located position away from the rotation center of the base; and the loading means includes a pillar for supporting a top end of the upper column when the column is sectioned into two parts, i.e., the upper column and the base column, and then folded.

According to at least an embodiment of the present invention; the loading means includes the pillar for supporting the top end of the upper column when the column is sectioned into two parts, i.e., the upper column and the base column, and then folded, while the loading means shifting the center of gravity of the base closer to the rotation center of the base. Therefore, no extra member for installing the pillar is needed.

In at least an embodiment of the industrial robot according to the present invention, the hinge, the supporting members, and the pillar are placed at the time of transporting the industrial robot, and are then removed after transporting the industrial robot to the working space.

According to at least an embodiment of the present invention; the hinge, the supporting members, and the pillar are placed at the time of transporting the industrial robot, and are then removed after transporting the industrial robot to the working space. Therefore; these components, if removed, do not become obstacles to usual workpiece transfer operation by the industrial robot after its transportation and installation, and furthermore these components can also be re-used for transportation of other industrial robots.

In at least an embodiment of the industrial robot according to the present invention, the industrial robot further includes; a ball screw shaft being hung and supported at a top end of the upper column, the ball screw shaft moving the arm unit in the vertical direction; a drive source being placed at a bottom end of the base column, and the drive source driving the ball screw shaft to turn; a ball screw shaft support member fixed to a bottom end of the upper column, the ball screw shaft support member extending long toward the drive source side of the base column for supporting the ball screw shaft; and a joint member that enables connection and disconnection of the ball screw shaft and the drive source. In this situation; preferably, the ball screw shaft support member should bend together with the upper column while supporting the ball screw shaft, when the column is folded.

According to at least an embodiment of the present invention; at the time of bending the upper column, the ball screw shaft for vertically transferring the arm units call be disassembled from the drive source for the ball screw shaft; and then the ball screw shaft can be connected to the drive source for the ball screw shaft at the time of the restoration work after transportation. Therefore, for example, the ball screw shaft, which is a long and heavy component, can be transported together with the main parts of the industrial robot, without being removed independently.

To achieve the object mentioned previously, at least an embodiment of a method of transporting an industrial robot to a predetermined working space according to the present invention is for the industrial robot that includes; an arm unit equipped with a hand for placing a workpiece on the hand, and a column for supporting the arm unit so as to enable the arm unit to move in a vertical direction, wherein the industrial robot carries out transfer work of the workpiece at the working space; characterized in that the industrial robot comprises: a hinge for sectioning and folding the column into two parts, i.e., a base column and an upper column, at an intermediate position in the vertical direction; supporting members placed on each of the base column and the upper column separately; screw support members placed on each of the supporting members; and a screw shaft that is screwed into the screw support members, a base column side and an upper column side of the screw shaft being threaded reversely to each other; and the method of transporting the industrial robot includes: folding the column by turning the screw shaft at the time of transportation, and standing the column upright by turning the screw shaft reversely after the transportation.

According to at least an embodiment of the present invention; the column can be folded by turning the screw shaft at the time of transportation, and then the column can be made to stand upright by turning the screw shaft reversely after the transportation. Therefore, even when the industrial robot is so long in a vertical direction that it cannot be transported as it is, the robot can be so postured as to enable transportation of the robot through simple preparation for transportation without complicated disassembling and re-assembling work. Furthermore, the industrial robot can be rebuilt easily without any large crane or the like at a work site of a transportation destination.

In at least an embodiment of the method of transporting an industrial robot according to the present invention, the industrial robot includes; a pillar for supporting a top end of the upper column when the column is sectioned and then folded into two parts, i.e., the upper column and the base column; and the hinge, the supporting members, and the pillar are placed at the time of transportation, and then removed after the transportation to the working space.

According to at least an embodiment of the present invention; the hinge, the supporting members, and the pillar are placed at the time of transporting the industrial robot, and are then removed after transporting the industrial robot to the working space. Therefore; these components, if removed, do not become obstacles to usual workpiece transfer operation by the industrial robot after its transportation and installation, and furthermore these components can also be re-used for transportation of other industrial robots.

According to at least an embodiment of the industrial robot and the method of transporting the robot relating to the present invention, a column extending vertically is sectioned into two parts, i.e., a base column and an upper column, which are then folded so as to enable transportation of the robot, as it is under the condition. Therefore, even when an industrial robot is so long in a vertical direction that it cannot be transported as it is, the robot can be so postured as to enable transportation of the robot through simple preparation for transportation without complicated disassembling and re-assembling work. Furthermore, the robot can be rebuilt easily without any large crane or the like at a work site of a transportation destination.

Preferably, at least an embodiment of the present invention should be applied to an industrial robot; being large-sized, extending long vertically, and weighing heavily; to be proposed as a transfer robot for transferring LCD panels, PDP panels, and the like that become larger especially in these years.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENT

A preferred embodiment of the present invention is described below with reference to the accompanying drawings. Incidentally, an industrial robot and a method of transporting the robot according to the present invention are not limited to the following descriptions and drawings, as long as the robot and the transportation method have their technical characteristics as described below.

Figure 1:
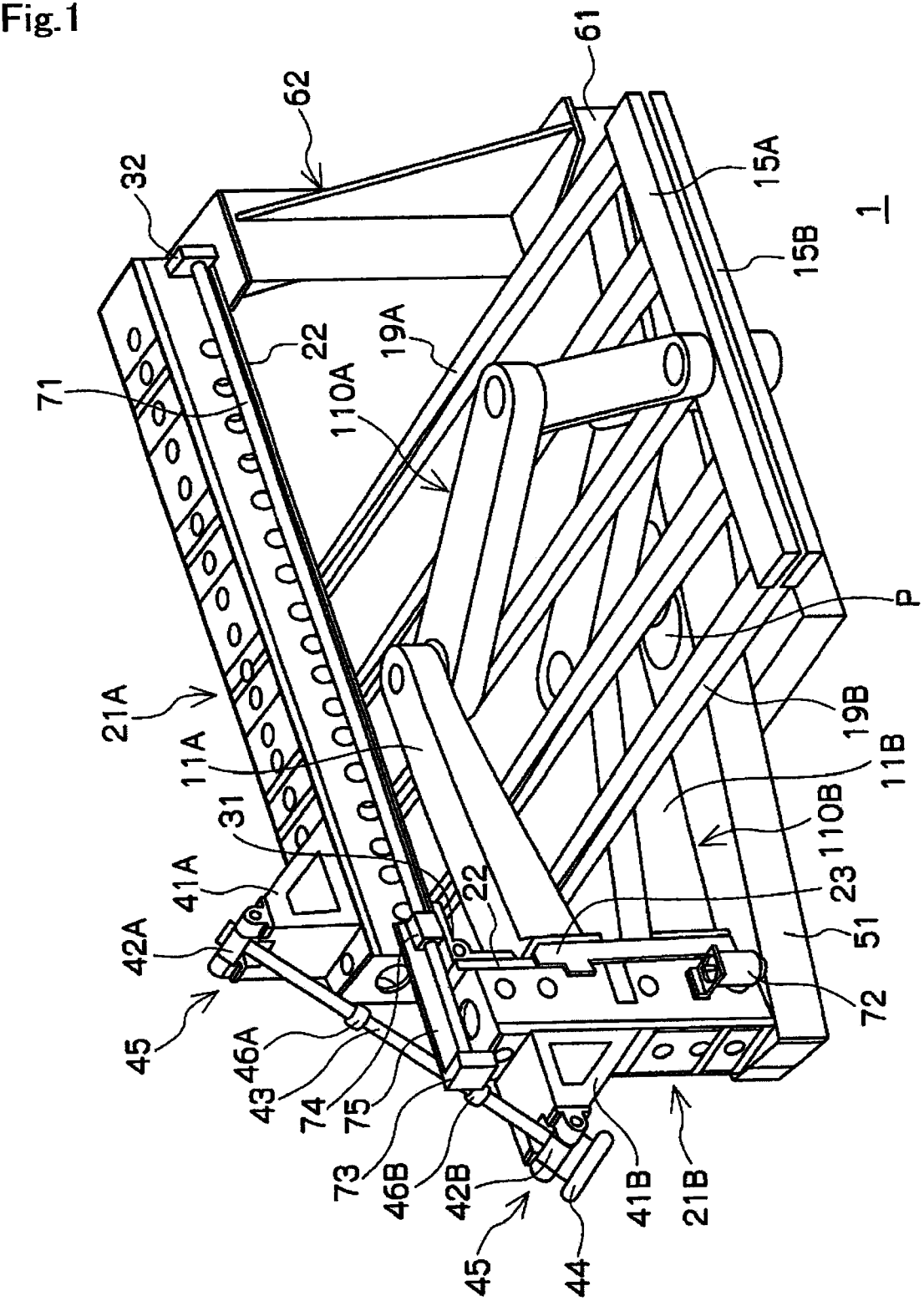
FIG. 1 is a perspective view of a posture of at least an embodiment of an industrial robot according to the present invention, while the robot being in transporting operation.
Figure 2:
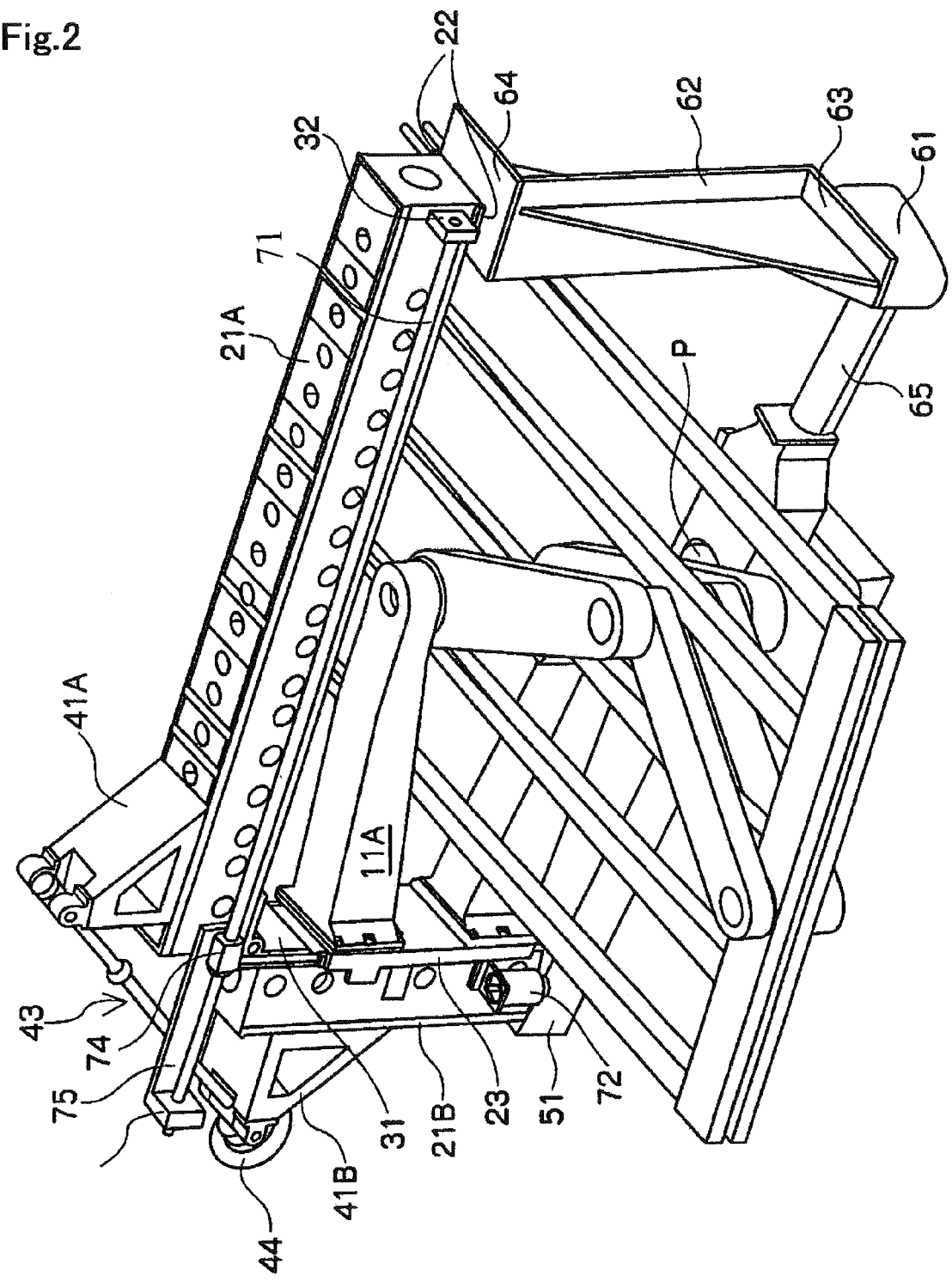
FIG. 2 is another perspective view of the posture of the industrial robot, while the robot being in transporting operation and the posture being viewed from a direction different from the direction of FIG. 1.
Figure 3:
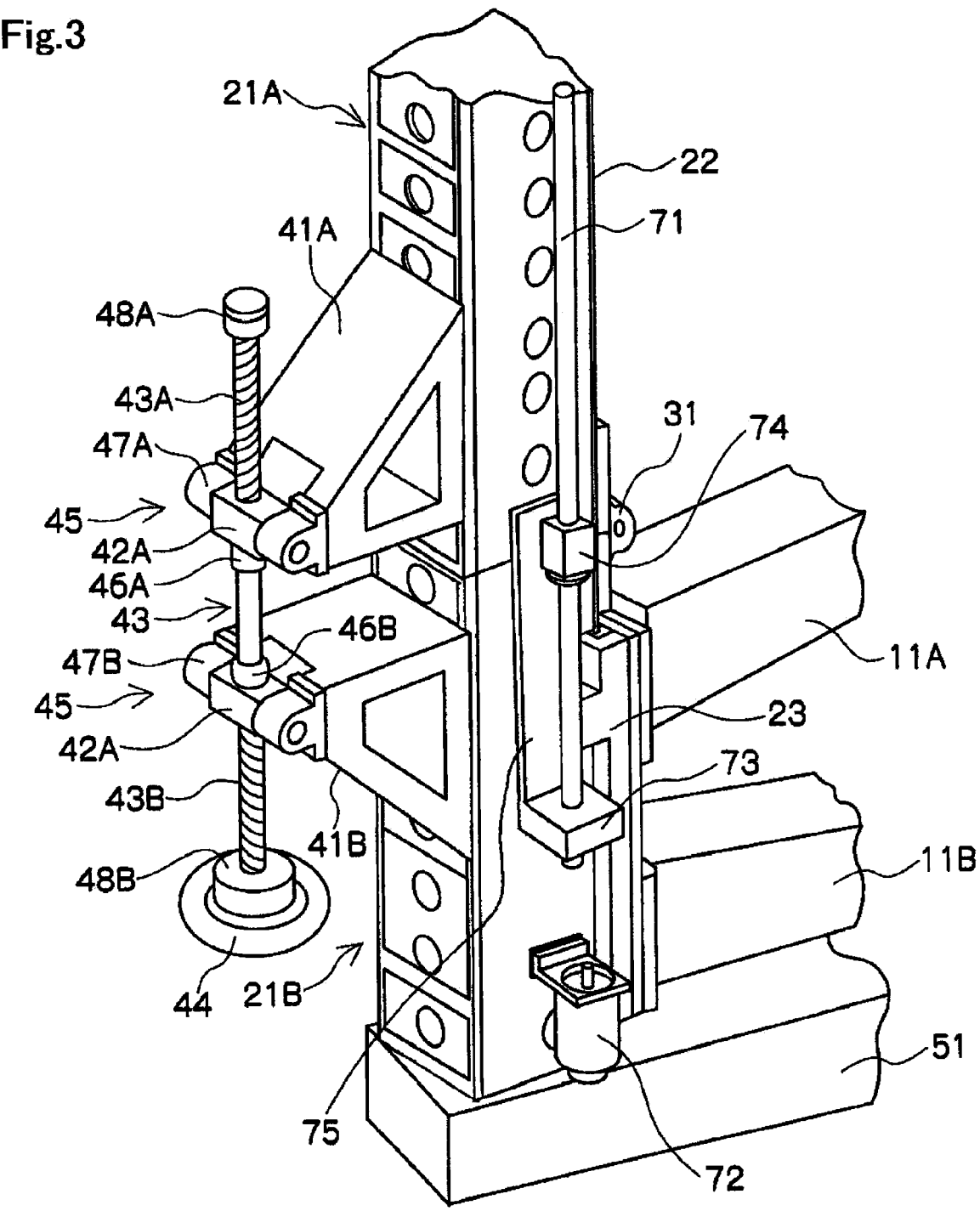
FIG. 3 is a perspective view of the industrial robot, while the robot being under a condition just before the robot has a posture for transporting operation.
Figure 4:
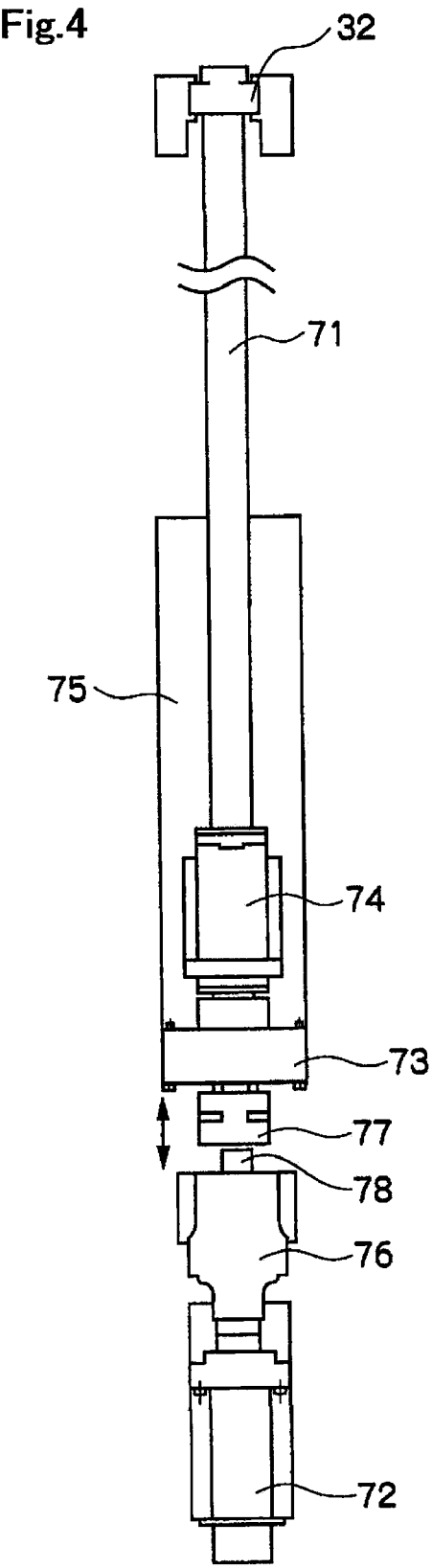
FIG. 4 is an explanatory view showing a condition of a ball screw shaft.
Figure 5:
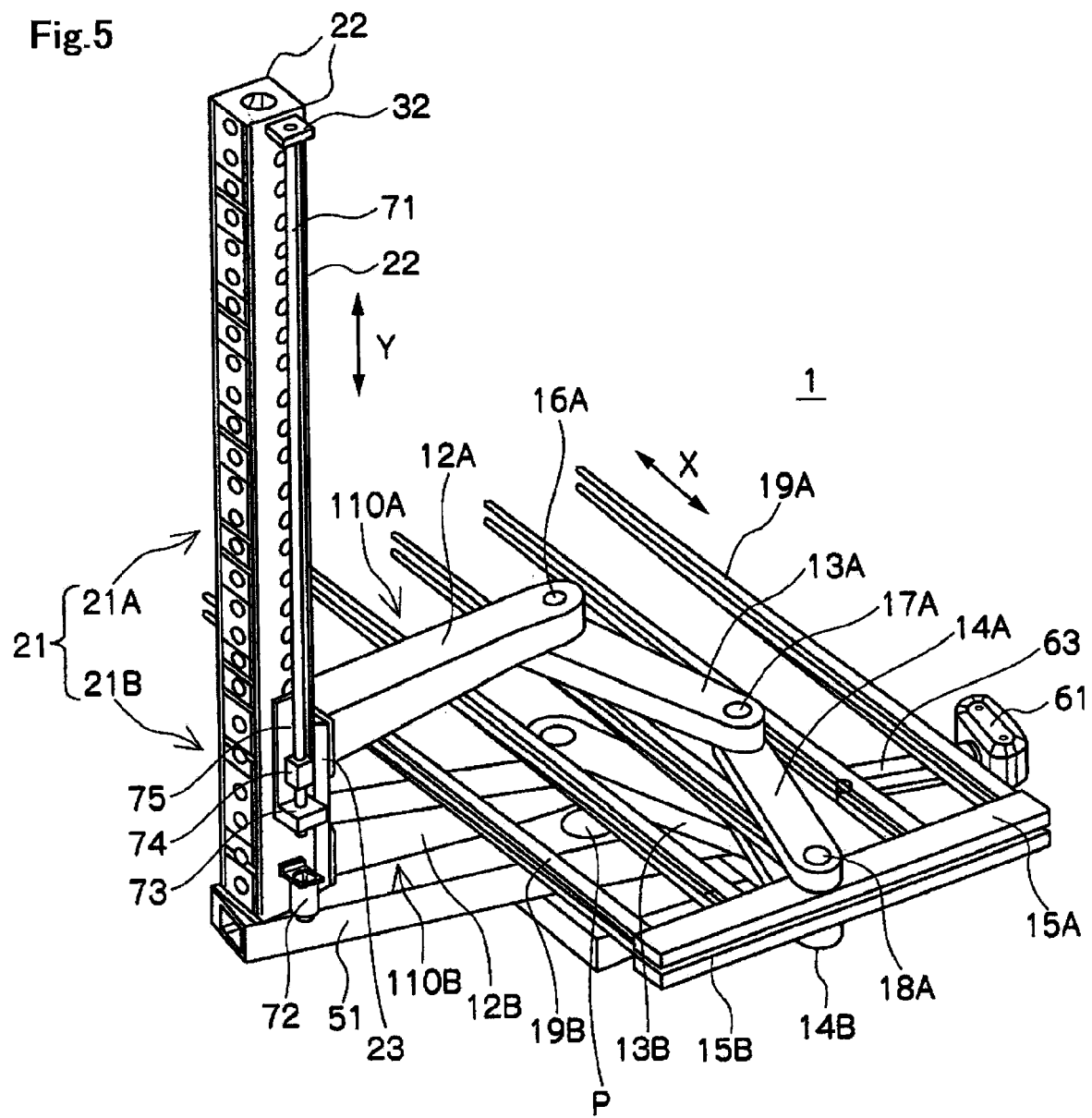
FIG. 5 is a perspective view of a posture of the industrial robot, while the robot being just before or after transportation.
Figure 6:
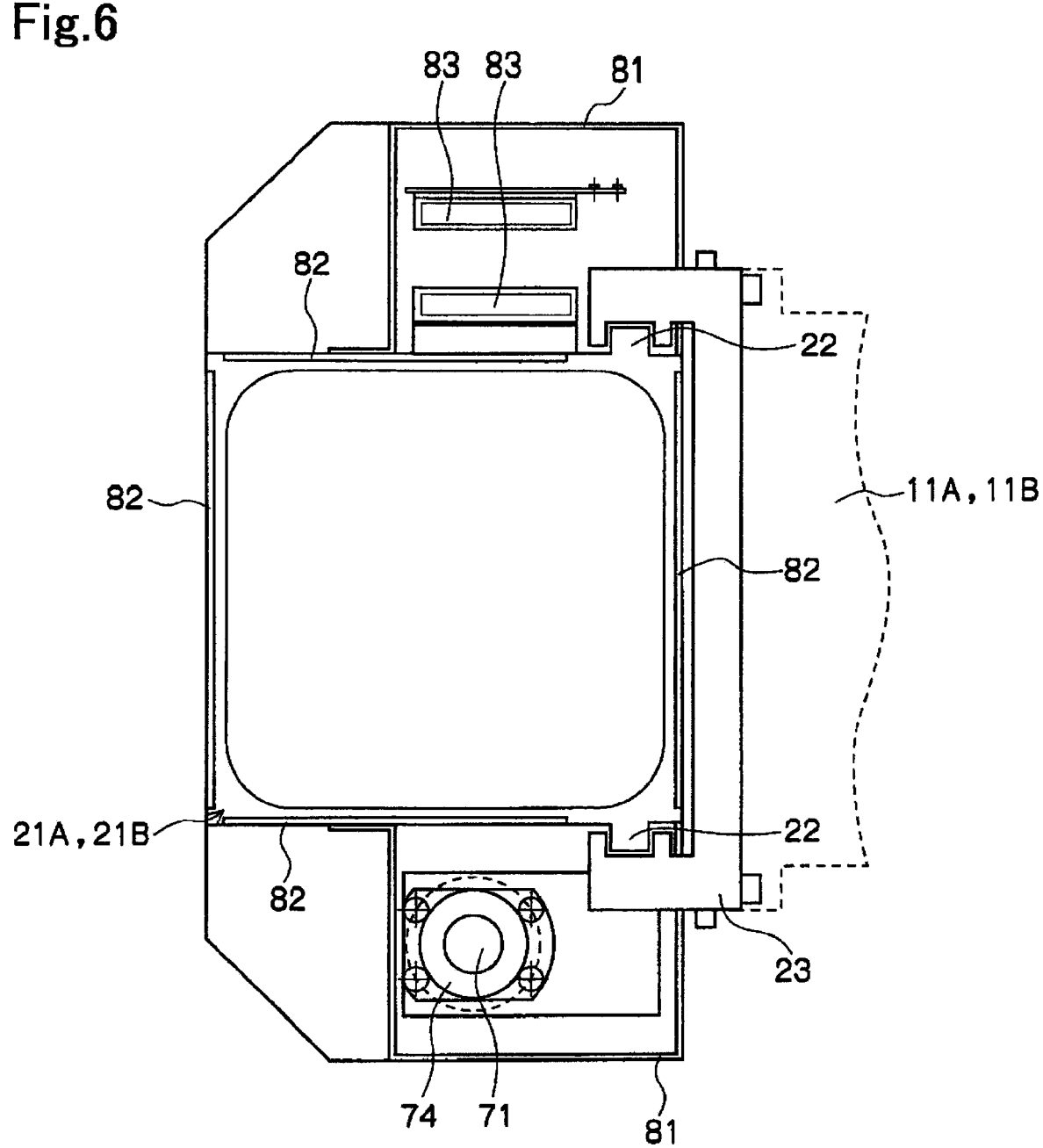
FIG. 6 is a cross-sectional view of a column.

FIG. 1 is a perspective view of a posture of at least an embodiment of an industrial robot according to the present invention, while the robot being in transporting operation; and FIG. 2 is another perspective view of the posture of the industrial robot, while the robot being in transporting operation and the posture being viewed from a direction different from the direction of FIG. 1. FIG. 3 is a perspective view of the industrial robot, while the robot being under a condition just before the robot has a posture for transporting operation. FIG. 4 is an explanatory view showing a condition of a ball screw shaft; FIG. 5 is a perspective view of a posture of the industrial robot, while the robot being just before or after transportation; and FIG. 6 is a cross-sectional view of a column. In FIG. 1 through FIG. 5, covering members 81 and 82 that cover the column are omitted not to be shown.

At least an embodiment of an industrial robot 1 according to the present invention carries out transfer work of a workpiece (not shown) such as a glass substrate at a predetermined working space in a clean room, for example, within a production process for manufacturing LCD panels and PDP panels. As shown in FIG. 1, the industrial robot 1 includes; arm units 110A and 110B having hands 15A and 15B, respectively, for loading workpieces; and a column 21 (including 21A and 21B) for supporting the arm units 110A and 110B in such a manner that the arm units 110A and 110B can move vertically. Then, under normal conditions, the industrial robot 1 carries out operation for transporting a workpiece with a posture shown in FIG. 5; and meanwhile the column 21 is folded as shown in FIG. 1, when the industrial robot 1 is transported.

For the industrial robot 1, exemplified is a configuration including a couple of arm structures that face each other, as shown in FIG. 1 and FIG. 5. The industrial robot 1 is a double-arm robot; in which the hands 15A and 15B that the two arm units 110A and 110B have, respectively, are so placed as not to interfere with each other and as to face each other in a vertical direction.

The arm unit 110A has an arm structure for loading and transferring a workpiece. As shown in FIGS. 1 & 5, the arm unit 110A includes; a first arm 12A, a second arm 13A, and a third arm 14A, which are supported by an arm support 11A; and a hand 15A (having a claw 19A). Each of the first arm 12A, the second arm 13A, the third arm 14A, and the hand 15A turns by using each of the joint parts 16A, 17A, and 18A located between every two corresponding arms as a turning axis so that, as a whole, the arm unit can move as an expandable unit. Incidentally, the industrial robot 1 described in this application is a double-arm robot that further includes another arm unit 110B having; a first arm 12B, a second arm 13B, and a third arm 14B, which are supported by an arm support 11B; and a hand 15B. Then, the couple of arm units 110A and 110B are so structured as to expand in a direction 'X' shown in FIG. 5. However, the number of arms and movement of the arm units 110A and 110B are not limited to the above descriptions, and thus the arm units may implement expanding motion as shown in FIG. 5, and may carry out turning motion as well.

A workpiece (not shown in the figures) is loaded on claws 19A and 19B of the arm units 110A and 110B, and then transferred. As the workpiece, for example, a glass substrate for an LCD device may be enumerated; and especially the industrial robot 1 according to the present invention may be preferably applied to transferring a large-sized workpiece such as a large-area glass substrate sized, for example, 2850 mm×3500 mm that is so called a '10th-generation substrate'.

As shown in FIGS. 1, 6, and others; the column 21 (including 21A and 21B) is a pillar structure member having its cross section of rectangle; and the column 21 includes a guide rail 22 that guides the arm supports 11A and 11B moving vertically in a direction Y', the arm supports 11A and 11B supporting the arm units 110A and 110B. The guide rail 22 works as a guide function for a slider 23 to which the couple of arm supports 11A and 11B are fixed, and the guide rail 22 is placed longitudinally in a vertical direction at a predetermined position on an opposing surface of the column 21 that is a pillar structure member. The slider 23 is equipped with a ball screw nut 74, which is coupled to a ball screw shaft 71 that implements driving the ball screw nut 74 in the vertical direction 'Y'. Then, the ball screw shaft 71 is connected to a drive source 72, and operation of the drive source 72 moves the slider 23 vertically so as to move the arm supports 11A and 11B and eventually to move the arm units 110A and 110B vertically.

Incidentally, shown in FIG. 6 are covering members 81 and 82 that cover the column 21. Under normal conditions, the industrial robot 1 shown in FIG. 5 is covered with those covering members 81 and 82. However, when the industrial robot 1, those covering members 81 and 82 are partly or entirely removed, as required. Furthermore, shown in FIG. 6 is a cable rack 83 for a power cable and/or a signal cable that transmit drive power to the arm units 110A and 110B.

Fixed to the slider 23 shown in the figures are the two arm supports 11A and 11B. However, each of the arm supports 11A and 11B may be fixed to each independent slider so that the slider independently moves in the vertical direction 'Y'. In this case, each slider needs to be independently equipped with its own ball screw nut and ball screw.

For transportation of the industrial robot 1, the column 21 is sectioned into two parts, i.e., a base column 21B and an upper column 21A at the time of preparation for transportation, and then the two parts are folded and the industrial robot his transported. At the time of installation work after transportation, the folded parts are restored so that the column stands upright to be installed in a predetermined space. As shown in FIGS. 1 to 3, the column 21 is sectioned at an intermediate position in the vertical direction 'Y' into two parts, i.e., the base column 21B and the upper column 21A so as to be foldable. The intermediate position in the vertical direction 'Y' is located at a predetermined point between a top end of the column 21 (a top end of the upper column 21A) and a bottom end of the column 21 (a bottom end of the base column 21B). Though no restriction is imposed on the location of the folding point between the upper column 21A and the base column 21B, preferably the column 21 should be sectioned and folded at a position as close to a bottom end of the ball screw shaft 71 as possible, since the upper column 21A is usually folded together with the ball screw shaft 71. It will be understood that the term "intermediate position" refers to a prescribed position between a top end and a bottom end of the column, and it not limited to a specific position such as the median.

Furthermore, when the column 21 is folded for transportation of the industrial robot 1, usually the ball screw nut 74 and the slider 23 are disconnected from each other. Therefore, as shown in FIGS. 1 and 3, the slider 23 is in a condition where a bottom of the slider 23 contacts with a surface of the base 51. In other words, the arm supports 11A and 11B fixed to the slider 23 as well as the arm units 110A and 110B remain in resting state at their lowest positions. Accordingly, the folding point between the upper column 21A and the base column 21B is positioned higher than the arm support 11A at lowest.

A hinge 31 is placed at an internal corner side of a border of the folding point between the upper column 21A and the base column 21B. The hinge 31 may be placed only during transportation, or may stay at the position even after installation work in the working space. In a case where the hinge 31 is placed only during transportation, a fixing member for fixing the upper column 21A and the base column 21B is removed under a condition, in which the industrial robot 1 being not in transportation and the column stands upright, as shown in FIG. 5. Subsequently, the hinge 31 is placed onto a placement position for the fixing member by using bolts and the like, and then the column is so folded as to have a posture for transportation, as FIG. 1 and others show. Afterwards, the column 21 is made to stand upright by installation work after transportation, and then the hinge 31 is removed and the fixing member is installed.

On the other hand, at an external corner side of the border of the folding point between the upper column 21A and the base column 21B, the external corner of the border becoming a peak of the corner; supporting members 41B and 41A are placed onto the base column 21B and the upper column 21A, respectively, around the border in such a manner that both the supporting members protrude toward the external corner side. The supporting members 41B and 41A are so placed on the column 21 as to face each other in the vertical direction 'Y'. At top parts 45 of the supporting members 41B and 41A, wherein the top parts 45 are located away from the column 21; screw support members 42A and 42B are placed. Then, a screw shaft 43 is screwed into the screw support members 42A and 42B. A base column side part and an upper column side part of the screw shaft 43 are each provided with a screw part; wherein the two screw parts are threaded reversely to each other (A screw part 43A and a screw part 43B are threaded reversely to each other); and a screw shaft turning means 44 for turning the screw shaft 43 is usually placed at a bottom end of the screw shaft 43. Furthermore, the screw shaft 43 has a stopper 46A and a stopper 46B. The two stoppers operate in such a manner that the stopper 46A and the stopper 46B place restrictions on a screwing range of the screw part 43A and the screw support member 42A, as well as another screwing range of the screw part 43B and the screw support member 42B, respectively. Then, the screw support members 42A and 42B are fixed to assembly guides 47A and 47B placed at the top parts 45 of the supporting members 41A and 41B so as to be rotatable.

In the same way as described above for the hinge 31, the supporting members 41A and 41B and their related components described above may be placed only during transportation, or may stay at the position even after installation work in the working space; and usually they are placed only during transportation. For installing the components, a fixing member for fixing the upper column 21A and the base column 21B is removed at first under a condition, in which the industrial robot 1 being not in transportation and the column stands upright, as shown in FIG. 5. Subsequently, the supporting members 41A and 41B are placed onto a placement position for the fixing member by using bolts and the like, and furthermore the screw shaft 43 screwed into the screw support members 42A and 42B is collectively assembled to the supporting members 41A and 41B.

The supporting members 41A and 41B and their related components are assembled as FIG. 3 shows. In other words; the supporting members 41A and 41B, each of which is shaped almost like a right-angled triangle, are placed onto the upper column 21A and the base column 21B, respectively, in such a way that their right-angled sections are disposed face to face. The screw support members 42A and 42B are assembled to the assembly guides 47A and 47B placed at the top parts 45 of the supporting members 41A and 41B so as to be rotatable. Then, the screw part 43A and the screw part 43B are screwed into the screw support members 42A and 42B in such a way that the stopper 46A and the stopper 46B of the screw shaft 43 come into contact with the screw support members 42A and 42B, respectively.

Under the condition where the column 21 stands upright as shown in FIG. 3; turning a handle, which works as the screw shaft turning means 44, can section and fold the column 21 into two parts, i.e., the upper column 21A and the base column 21B, so as to have a posture for transportation as shown in FIGS. 1 and 2. Turning the handle continues until a top end of the upper column 21A comes in contact with a top surface of a pillar 62, and meanwhile the screw shaft 43 has its length that enables implementation of such a posture with the folded column. Incidentally at a top end and an end of the handle side, the screw shaft 43 has safety stoppers 48A and 48B that prevent the screw shaft 43 from coming off the screw support members 42A and 42B.

When the industrial robot 1 is installed at an installation spot in a working space after transporting the robot with its column folded; the hinge 31, the supporting members 41A and 41B, and their related parts are removed, as required. According to at least an embodiment of the present invention; the hinge 31, the supporting members 41A and 41B, and their related parts can be removed voluntarily. Therefore; these components, if removed, do not become obstacles to usual workpiece transfer operation by the industrial robot 1 after its transportation and installation, and furthermore these components can also be re-used for transportation of other industrial robots.

As described above, at least an embodiment of the industrial robot 1 according to the present invention includes: the supporting members 41A and 41B, the screw support members 42A and 42B, the screw shaft 43, the screw shaft turning means 44, and other related parts so that the column 21 extending in the vertical direction 'Y' can be sectioned into two parts, i.e., the base column 21B and the upper column 21A, which can be then folded. As a result, even in the case of the industrial robot 1, which has the column 21 extending long in the vertical direction 'Y' so that it cannot be transported as it is, the industrial robot can be postured so as to enable transportation of the industrial robot through simple preparation for transportation without complicated disassembling and re-assembling work. Furthermore, the industrial robot can be rebuilt easily without any large crane or the like at a work site of a transportation destination. Especially, it is possible to easily carry out installation and re-building work in a limited space, such as a clean room and the like.

Moreover, since the screw support members 42A and 42B are assembled to the top parts of the supporting members 41A and 41B so as to be rotatable, the screw support members 42A and 42B assembled to the top parts of the supporting members rotate in accordance with bending condition of the upper column 21A, as the upper column 21A bends down. As a result, when a center of gravity of the upper column 21A shifts within a range from the tip side to the bottom side of the column according to a change of the bending condition of the upper column 21A, the screw shaft 43 has no bending stress but only a tensile stress and a compressive stress in a direction of the screw shaft. Therefore, the screw shaft 43 screwed into the screw support members 42A and 42B can smoothly rotate without any problem to bend the upper column 21A. Consequently, preparation for transportation as well as installation and re-building work after the transportation of the industrial robot 1 can be carried out safely.

Incidentally, the industrial robot 1 includes a base 51, which is rotatable and on which the column 21 is installed, as shown in FIGS. 1, 2, and others. The column 21 is installed at an eccentrically-located position away from a rotation center 'P' of the base 51. Then, placed at an opposing position in relation with the position of the column 21 is a loading means 61 for shifting a center of gravity of the base 51 closer to the rotation center 'P'. Furthermore, placed on the loading means 61 is the pillar 62 that supports the top end of the upper column 21A when the column 21 is sectioned into two parts, i.e., the upper column 21A and the base column 21B, and then folded. The loading means 61 is a heavy load, for example, as shown in FIG. 5; and it is connected to the base 51. Since the pillar 62 is installed onto the loading means 61 for shifting the center of gravity of the base 51 closer to the rotation center 'P', no extra member for installing the pillar 62 is needed.

Furthermore, after transportation of the industrial robot 1, conveniently required is removing the pillar 62 only.

There is no restriction on a form of the pillar 62; and a columnar member manufactured with plate materials, as exemplified in FIGS. 1 and 2, can be used. Since the upper column 21A, which is heavy enough, is loaded onto the pillar 62, preferably the pillar 62 should be structured with sufficient strength, and preferably be equipped with reinforcing members (not shown), as required.

The ball screw shaft 71 is hung and supported by a hanging member 32 placed at the top end of the upper column 21A, and the ball screw shaft 71 functions for moving the arm units 110A and 110B in the vertical direction 'Y' by means of the arm supports 11A and 11B that are fixed to the slider 23. Specifically to describe, coupled to the ball screw shaft 71 is the ball screw nut 74 assembled to the slider 23. Therefore, by means of the ball screw shaft 71 driven by the drive source 72 placed on the base column 21B, the ball screw nut 74 moves in the vertical direction 'Y' so that the arm supports 11A and 11B supporting the arm units 110A and 110B moves in the vertical direction 'Y'.

Fixed at the bottom end of the upper column 2 1A is a ball screw shaft support member 75 for supporting the ball screw shaft 71 at its bottom end. As the ball screw shaft support member 75, a plate-like component extending long toward the drive source side of the base column 21B is preferably adopted. Then, the ball screw shaft support member 75 is assembled in such a way that the ball screw shaft support member 75 bends together with the upper column 21A while supporting the ball screw shaft 71 at its bottom end, when the column 21 is folded. Therefore, it is preferable that the ball screw shaft support member 75 extends so long as close to the bottom end of the ball screw shaft 71 as possible. For example, when the ball screw shaft support member 75 is provided as a plate-like component as shown in FIGS. 3 and 4, preferably a top end of the plate-like component is fixed to the upper column 21A with screws or the like, and meanwhile a bottom end of the plate-like component preferably extends down to around a tip of the ball screw shaft 71.

Specifically to describe with reference to FIGS. 3 and 4, a top end of the ball screw shaft 71 is hung and supported by the hanging member 32, while the bottom end of the ball screw shaft 71 is supported by a bearing 73 placed at the bottom end of the ball screw shaft support member 75. As shown in FIG. 5, during usual workpiece transfer operation, the ball screw shaft support member 75 is fixed to both the upper column 21A and the base column 21B by using bolts and the like. The ball screw shaft 71 is either directly connected to a motor shaft 78 of a motor as the drive source 72 by way of a coupling as a joint member 77, or connected to the motor shaft with a speed reducer installed. On the other hand, the ball screw nut 74 is fixed to the slider 23 that acts as a guide for the arm supports 11A and 11B, and then the ball screw nut 74 vertically transfer the arm units 110A and 110B by way of the arm supports 11A and 11B while the ball screw shaft 71 is turning.

In the case of a structure of the ball screw shaft 71 and its peripheral components as described above; when the column 21 is to be bent for transportation of the industrial robot 1, the ball screw nut 74 and the slider 23 are disconnected from each other at first. To be loosened next is the coupling as the joint member 77 that connects the motor shaft 78 and the ball screw shaft 71, and then the coupling is slid so as to eventually disconnect the joint part. Furthermore, if the ball screw shaft support member 75 is connected to the base column 21B, the connection is undone. Through these procedures, the ball screw shaft 71 comes into a condition where the ball screw shaft 71 is connected only to the upper column 21A but not to the base column 21B. As a result, when the upper column 21A is bent and laid down as shown in FIGS. 1 and 2, the ball screw shaft 71 can be laid down together with the upper column 21A. In installation work after transportation of the industrial robot, carrying out the procedures in reverse order can restore the posture of the industrial robot as it was.

Through the procedures described above, at the time of bending the upper column 21A, the ball screw shaft 71 for vertically transferring the arm supports 11A and 11B can be disassembled from the drive source 72 for the ball screw shaft 71; and then the ball screw shaft 71 can be connected to the drive source 72 for the ball screw shaft 71 at the time of the restoration work after transportation. Therefore, for example, the ball screw shaft 71, which is a long and heavy component, can be transported together with the main parts of the industrial robot 1, without being removed independently. Incidentally, when the upper column 21A is bent for transporting the industrial robot 1, the arm units 110A and 110B are in a condition where the dimension of the arm units is minimized in the direction 'X', as shown in FIG. 5.

The embodiment described above is an example of at least a preferred embodiment according to the present invention, but the present invention is not limited to the above embodiment and various variations and modifications may be made without changing the concept of the present invention. For example, in the embodiment described above, the arm units 110A and 110B are those of a type that expand and contract in the direction 'X' shown in FIG. 5. However, without any restriction on the type of arm units, for example, the arm units 110A and 110B may be configured as those having movement of 3-degree-of-freedom on a plane.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An industrial robot comprising:
    an arm unit equipped with a hand structured to place a workpiece on the hand;
    a column structured to support the arm unit so as to enable the arm unit to move in a vertical direction;
    a hinge provided at an intermediate position in the vertical direction structured to section and fold the column into a base column and an upper column;

supporting members placed on each of the base column and the upper column;

screw support members placed on each of the supporting members;

a screw shaft that is screwed into the screw support members, a base column side and an upper column side of the screw shaft being threaded reversely to each other; and a screw shaft turning means for turning the screw shaft;

wherein the industrial robot carries out transfer work of the workpiece at a predetermined working space.

2. The industrial robot according to claim 1;

wherein the supporting members include top parts that are located away from the base column and the upper column; and the screw support members are assembled to the top parts so as to be rotatable.

3. The industrial robot according claim 1 wherein the industrial robot further comprises:

a base, which is rotatable and on which the column is installed; and a loading means placed at an opposing position in relation with the position of the column for shifting a center of gravity of the base closer to a rotation center of the base, the column being installed at an eccentrically-located position away from the rotation center of the base; and the loading means includes a pillar for supporting a top end of the upper column when the column is sectioned into the upper column and the base column, and then folded.

4. The industrial robot according to claim 3, wherein the hinge, the supporting members, and the pillar are attachable to the industrial robot at the time of transporting the industrial robot, and are removeable after transporting the industrial robot to the working space.

5. The industrial robot according to claim 1, wherein the industrial robot further comprises:

a ball screw shaft being hung and supported at a top end of the upper column, the ball screw shaft being structured to move the arm unit in the vertical direction;

a drive source being placed at a bottom end of the base column, the drive source being structured to drive the ball screw shaft to turn;

a ball screw shaft support member fixed to a bottom end of the upper column, the ball screw shaft support member extending toward the drive source side of the base column for supporting the ball screw shaft; and a joint member structured to enable connection and disconnection of the ball screw shaft and the drive source.

6. The industrial robot according to claim 5;

wherein the ball screw shaft support member bends together with the upper column while supporting the ball screw shaft, when the column is folded.

7. A method of transporting an industrial robot to a predetermined working space, wherein the industrial robot comprises an arm unit equipped with a hand structured to place a workpiece on the hand; a column structured to support the arm unit so as to enable the arm unit to move in a vertical direction; a hinge provided at an intermediate position in the vertical direction structured to section and fold the column into a base column and an upper column; supporting members placed on each of the base column and the upper column; screw support members placed on each of the supporting members; a screw shaft that is screwed into the screw support members, a base column side and an upper column side of the screw shaft being threaded reversely to each other; and a screw shaft turning means for turning the screw shaft; wherein the industrial robot carries out transfer work of the workpiece at a predetermined working space; the method of transporting the industrial robot comprising:

folding the column by turning the screw shaft at the time of transportation, and standing the column upright by turning the screw shaft reversely after the transportation.

8. The method of transporting an industrial robot according to claim 7, wherein the industrial robot further comprises:

a pillar for supporting a top end of the upper column when the upper column is sectioned and then folded with respect to the base column; and wherein the hinge, the supporting members, and the pillar are attachable at the time of transportation, and, after the industrial robot has been transported to the working spec, the hinge, the supporting members, and the pillar are removable.

* * * * *